(12) United States Patent
Niemelä

(10) Patent No.: US 7,315,966 B2
(45) Date of Patent: Jan. 1, 2008

(54) QUALITY MEASUREMENT OF CIRCUIT-SWITCHED SERVICE IN CELLULAR RADIO NETWORK

(75) Inventor: Kari Niemelä, Oulu (FI)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 10/091,602

(22) Filed: Mar. 7, 2002

(65) Prior Publication Data

US 2002/0119773 A1 Aug. 29, 2002

Related U.S. Application Data

(63) Continuation of application No. PCT/FI00/00792, filed on Sep. 19, 2000.

(30) Foreign Application Priority Data

Sep. 20, 1999 (FI) .................................. 19992002

(51) Int. Cl.
*G06F 11/00* (2006.01)
(52) U.S. Cl. ..................................................... 714/704
(58) Field of Classification Search ......... 714/704–708
See application file for complete search history.

(56) References Cited

U.S. PATENT DOCUMENTS

| | | | |
|---|---|---|---|
| 5,663,807 A | | 9/1997 | Propach et al. |
| 5,920,545 A | * | 7/1999 | Rasanen et al. ............ 370/232 |
| 6,097,957 A | * | 8/2000 | Bonta et al. ................ 455/446 |
| 6,201,960 B1 | * | 3/2001 | Minde et al. ............... 455/424 |
| 2004/0062274 A1 | * | 4/2004 | Hakansson et al. ......... 370/468 |

FOREIGN PATENT DOCUMENTS

| | | |
|---|---|---|
| EP | 853 393 | 7/1998 |
| EP | 868 037 | 9/1998 |
| KR | 10-0192801 | 7/1998 |
| KR | 1999-0066019 | 8/1999 |
| WO | WO 96/36146 | 11/1996 |
| WO | WO 96/36150 | 11/1996 |
| WO | WO 98/15946 | 4/1998 |
| WO | WO 98/53630 | 11/1998 |
| WO | WO 98/59509 | 12/1998 |
| WO | WO 99/04538 | 1/1999 |
| WO | WO 99/05871 | 2/1999 |
| WO | WO 99/40569 | 8/1999 |

* cited by examiner

*Primary Examiner*—Cynthia Britt
*Assistant Examiner*—John J. Tabone, Jr.
(74) *Attorney, Agent, or Firm*—Pillsbury Winthrop Shaw Pittman LLP

(57) ABSTRACT

The invention relates to a method of measuring the quality of a service transmitted on a traffic channel and to a cellular radio network. In the method the transmitter transmits user data to the receiver, but does not transmit all data frames because the user data are missing. The transmitter transmits control data to the receiver using associated control channels, and calculates the number of frames transmitted to the receiver on the traffic channel during a certain period. The receiver calculates the number of all frames received and decoded correctly during a certain period. A quality value is calculated for a service to be transmitted on the traffic channel during a certain period by subtracting the number of frames transmitted during said period from the number of frames received during said period and by dividing the difference obtained by the number of frames transmitted during said period.

32 Claims, 5 Drawing Sheets

QUALITY MEASUREMENT OF CIRCUIT-SWITCHED SERVICE IN CELLULAR RADIO NETWORK

This application is a Continuation of International Application PCT/FI00/00792 filed on the Sep. 19, 2000, which designated the U.S. and was published under PCT Article 21(2) in English

FIELD

The invention relates to a method of measuring the quality of a circuit-switched service transmitted on a traffic channel between a transmitter and a receiver in a cellular radio network, and to a cellular radio network.

BACKGROUND

On cellular radio networks data and speech are transmitted in the circuit-switched form, but nowadays packet-switched transmission is also possible. GPRS (General Packet Radio Service) is a GSM-based (Global System for Mobile Communications) service in which air interface capacity not in use in circuit-switching is used for packet transmission. The basic GPRS uses GMSK (Gaussian Minimum-Shift Keying) as the modulation method.

EGPRS (Enhanced GPRS) uses EDGE (Enhanced Data Rates for GSM Evolution) technology to increase data transmission capacity. In addition to the GMSK modulation normally in use in the GSM, 8-PSK (8-Phase Shift Keying) modulation can be applied to packet data channels. The main object is to provide non-real-time data transmission services, such as file copying and Internet browser use, but also real-time services for packet-switched transmission of speech and video images. In principle, the data transmission capacity may vary from a few kilobits per second even up to 400 kbit/s.

The quality meters of packet-switched services are advanced, whereas the quality meters used for circuit-switched services are less advanced. The quality of circuit-switched services is not actually measured; rather, the raw bit error ratio of the traffic channel, i.e. radio link, that implements the service is measured.

Examples of such quality values are parameters RX_QUAL_FULL and RX_QUAL_SUB used in the GSM system. The RX_QUAL_FULL gives the bit error ratio estimate of hundred frames included in four 26-multiframes, and the RX_QUAL_SUB gives the bit error ratio estimate of associated control channel frames and silence descriptor frames of four 26-multiframes transmitted during discontinuous transmission, i.e. the bit error ratio estimate of twelve frames altogether. The problem associated with these parameters is that they do not indicate the actual quality of service because the final bit error ratio is dependent on the channel coding used for the service, which is not taken into account in the calculation of these parameters. Another problem is that the transmitter does not necessarily know whether non-continuous transmission is used, and consequently these parameters may be given values that do not correspond to the real situation.

In the EGPRS a bit error probability is calculated for a traffic channel in packet transmission on the basis of soft bit decisions of a Viterbi decoder, for example. This can be implemented e.g. so that the first parameter BEP_MEAN indicates the average of bit error probability in an RLC (Radio Link Control) block and the second parameter BEP_STD indicates the standard deviation of bit error probability in the RLC block. When applied to circuit-switched transmission, the problem related to these parameters is that they are only estimates which reflect the raw bit error ratio.

BRIEF DESCRIPTION OF THE INVENTION

An object of the invention is to provide a method and an apparatus implementing the method to solve the above-mentioned problems. This is achieved with a method to be described next. This is a method of measuring the quality of a circuit-switched service transmitted on a traffic channel between a transmitter and a receiver in a cellular radio network, comprising: the transmitter transmits user data to the receiver using data frames of the traffic channel; the transmitter does not transmit all data frames of the traffic channel to the receiver because the user data are missing; the transmitter transmits control data to the receiver using associated control channels of the traffic channel; the transmitter calculates the number of frames transmitted to the receiver on the traffic channel during a certain period; the receiver calculates the number of all frames received and decoded correctly during a certain period; and a quality value is calculated for a service to be transmitted on the traffic channel during a certain period by subtracting the number of frames transmitted during said period from the number of frames received during said period and by dividing the difference obtained by the number of frames transmitted during said period.

The invention also relates to a cellular radio network comprising a transmitter and a receiver, which communicates with the transmitter over a traffic channel on which a circuit-switched service is transmitted and which consists of data frames and associated control channel frames; the transmitter comprising means for transmitting user data to the receiver using data frames of the traffic channel; the transmitter comprising means for not transmitting all data frames of the traffic channel to the receiver when the user data are missing; the transmitter comprising means for transmitting control data to the receiver using associated control channel frames of the traffic channel; the transmitter comprises means for calculating the number of all frames transmitted to the receiver on the traffic channel during a certain period; the receiver comprises means for calculating the number of all frames received on the traffic channel and decoded correctly during a certain period; and the cellular radio network comprises means for calculating a quality value for a service to be transmitted on the traffic channel during a certain period by subtracting the number of frames transmitted during said period from the number of frames received during said period, and by dividing the difference obtained by the number of frames transmitted during said period.

The invention is based on the idea that instead of an unreliable bit error ratio estimate and bit error probability, a value is calculated for the quality of a service, i.e. a frame erasure ratio FER according to the real transmitted and received frames.

The method and system of the invention provide several advantages. The most important advantage is that the invention provides a service quality meter which corresponds well to the real situation.

BRIEF DESCRIPTION OF THE DRAWINGS

The invention will be described in greater detail by means of preferred embodiments with reference to the accompanying drawings, in which.

DESCRIPTION OF EMBODIMENTS

Figure 1A:
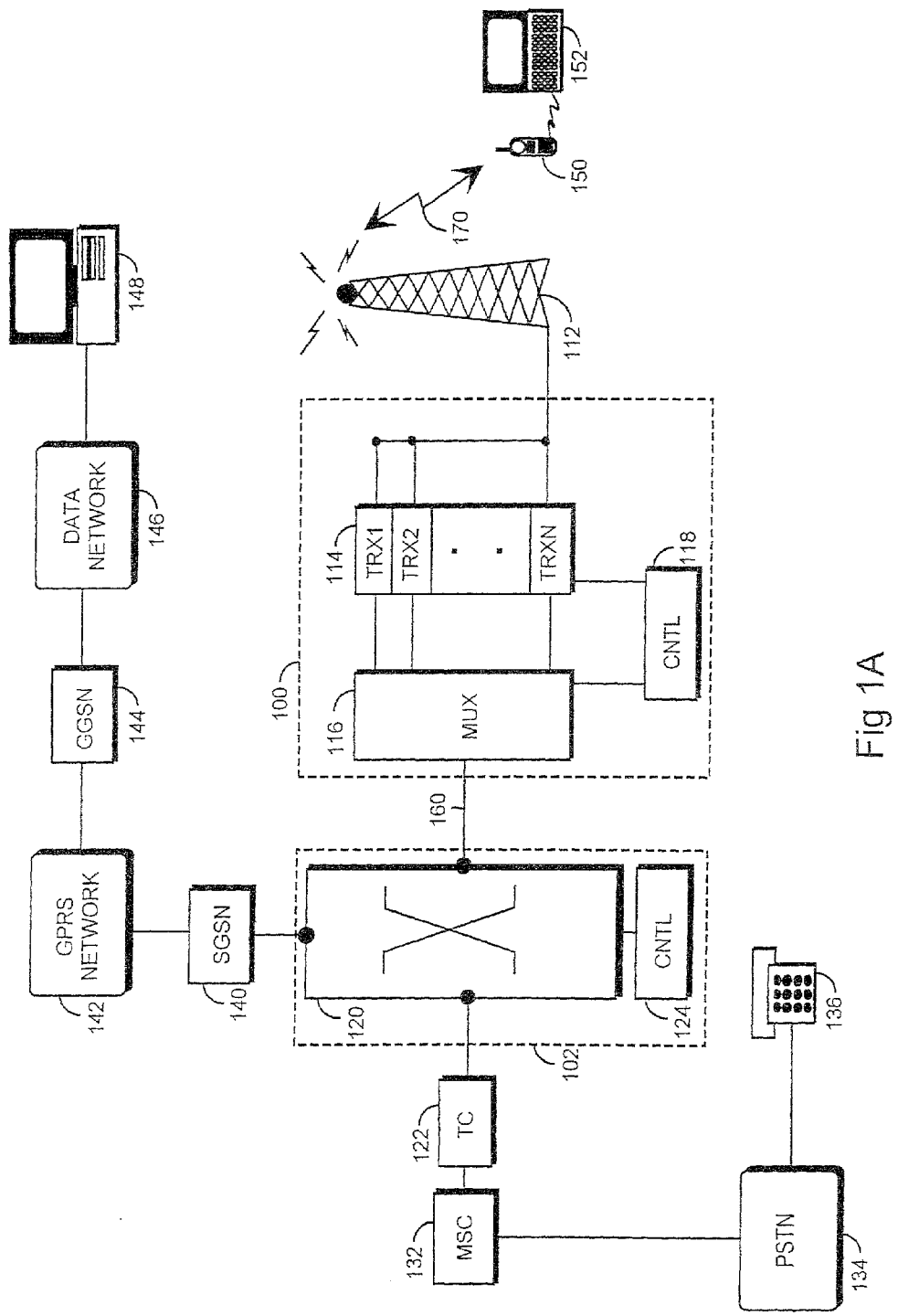
FIG. 1A is a block diagram of a cellular radio network.

A typical structure of a cellular radio network according to the invention and its connections to a fixed telephone network and a packet transmission network will be described with reference to FIG. 1A. FIG. 1A includes only the blocks necessary for describing the invention, but it will be obvious to a person skilled in the art that a conventional cellular radio network also comprises other functions and structures that need not be explained more closely in this context. The invention can be applied in cellular radio networks on which data are transmitted in the circuit-switched form; preferably the invention is used in the GSM system and in systems developed from the GSM system, e.g. in a circuit-switched data transmission service implemented with the EDGE and in systems utilizing AMR speech codecs (Adaptive Multi-Rate Speech Codec).

The cellular radio network typically comprises the infrastructure of a fixed network, i.e. a network part and subscriber terminals 150, which may be fixed, placed in a vehicle or portable. The subscriber terminal 150 may be e.g. a normal mobile station, and a portable computer 152, for example, can be connected to it with an expansion card. The computer can be used for ordering and processing packets in packet transmission.

The network part 100 comprises base stations 100. Several base stations 100 are controlled centrally by a base station controller 102 which communicates with the base stations. A base station 100 comprises transceivers 114, typically one to sixteen transceivers 114. One transceiver 114 offers radio capacity for one TDMA frame, i.e. typically for eight time slots.

The base station 100 comprises a control unit 118 which controls the function of transceivers 114 and a multiplexer 116. The multiplexer 116 is used for arranging the traffic and control channels used by several transceivers 114 on one transmission connection 160, which is called an Abis interface. The transmission connection 160 is typically implemented using a connection of 2 Mbit/s, i.e. a PCM link (Pulse Coded Modulation) which offers a transmission capacity of 30×64 kbit/s, time slots 0 and 31 being reserved for synchronization.

From the transceivers 114 of the base station 100 there is a connection to an antenna unit 112 which establishes a bi-directional radio connection 170 to the subscriber terminal 150. The structure of the frames to be transmitted on the bidirectional radio connection 170 is strictly defined and called an air interface.

The base station controller 102 comprises a switching field 120 and a control unit 124. The switching field 120 is used for switching speech and data and for connecting signalling circuits. A base station system formed by the base station 100 and the base station controller 102 also includes a transcoder 122. The transcoder 122 is usually located as close to a mobile services switching centre 132 as possible because this saves transmission capacity when speech is transmitted in the format of a cellular radio network between the transcoder 122 and the base station controller 102.

The transcoder 122 converts the different digital speech encoding formats used between the public switched telephone network and the radio telephone network into a compatible format, e.g. from the 64 kbits/s format of the fixed network into a format of the cellular radio network (e.g. 13 kbit/s), and vice versa. The control unit 124 is responsible for call controlling, mobility management, collection of statistics and signalling.

As is seen in FIG. 1A, the switching field 120 can establish connections (illustrated with black dots) both to a public switched telephone network PSTN 134 via the mobile services switching centre 132 and to a packet transmission network 142. In the public switched telephone network 134 a typical terminal 136 is a conventional telephone or an ISDN telephone (Integrated Services Digital Network).

The connection between the packet transmission network 142 and the switching field 120 is established by a support node 140 (SGSN=Serving GPRS Support Node). The function of the support node 140 is to transmit packets between the base station system and a gateway node (GGSN= Gateway GPRS Support Node) 144 and keep a record of the location of the subscriber terminal 150 in its area.

The gateway node 144 connects a public packet transmission network 146 and the packet transmission network 142. An Internet protocol or an X.25 protocol can be used at the interface. The gateway node 144 hides the internal structure of the packet transmission network 142 from the public packet transmission network 146 by encapsulating the structure, and thus the public packet transmission network 146 regards the packet transmission network 142 as a sub-network which comprises a subscriber terminal 150 to which the public packet transmission can send packets and receive packets from it.

The packet transmission network 142 is typically a private network which utilizes the Internet protocol and carries signalling and tunnelled user data. The structure of the network 142 may vary according to the operator in respect of its architecture and protocols below the Internet protocol layer.

The public packet transmission network 146 may be e.g. the worldwide Internet network, there being a terminal 148, e.g. a server computer, connected to the Internet which wants to transmit packets to the subscriber terminal 150.

Figure 1B:
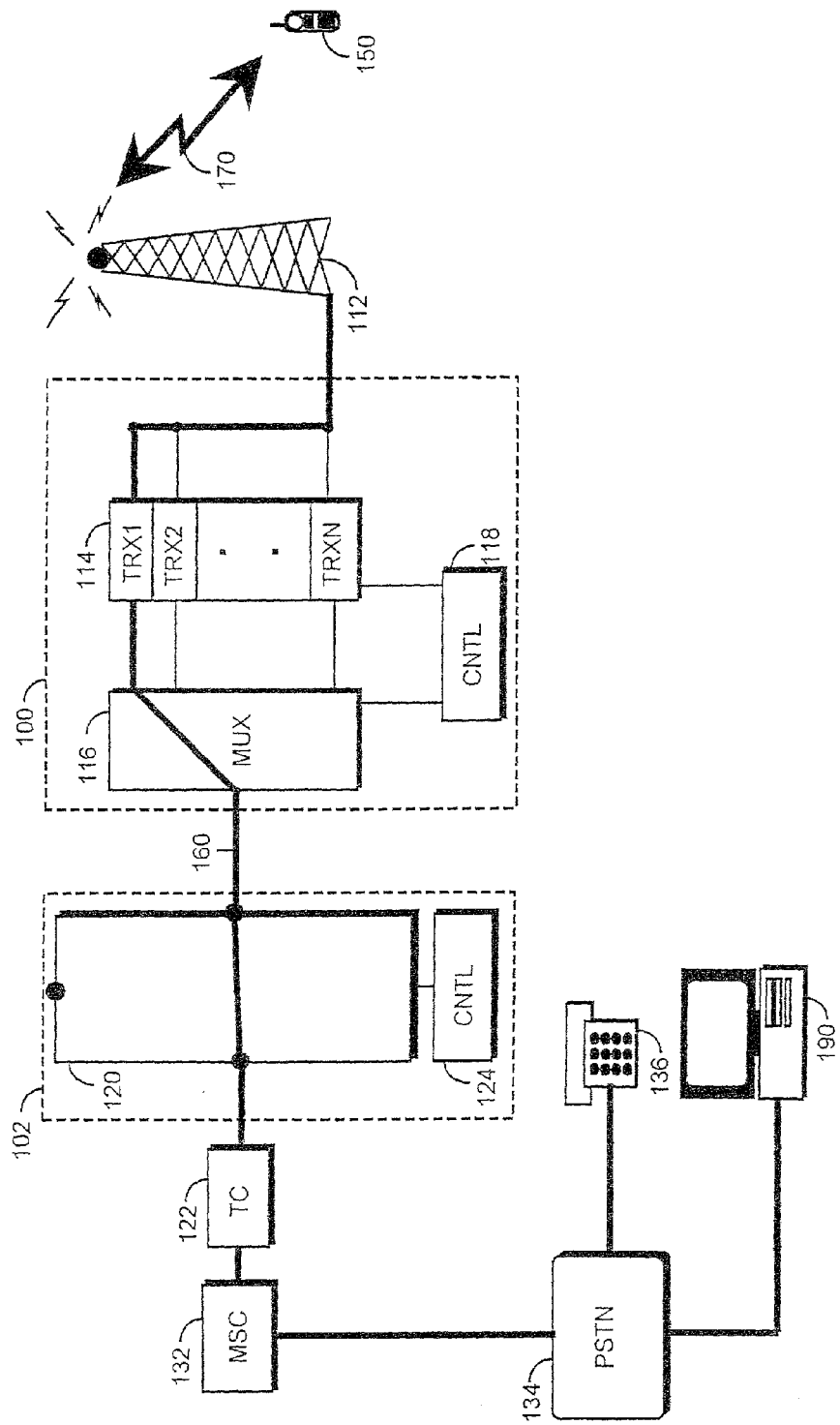
FIG. 1B illustrates a circuit-switched data transmission service and a speech transmission service.

FIG. 1B illustrates how a circuit-switched connection is established between the subscriber terminal 150 and a terminal 136 of the public switched telephone network. The bold line in the figures illustrates how data passes through the system at the air interface 170, from the antenna 112 to the transceiver 114 and from the transceiver in a form multiplexed in the multiplexer 116 over a transmission connection 160 to the switching field 120 where a connection is established to the output towards the transcoder 122 and further to the terminal 136 connected to the public switched telephone network 134 through switching performed at the mobile services switching centre 132. In the base station 100 the control unit 118 controls the multiplexer 116 in performing of transmission, and in the base station controller 102 the control unit 124 controls the switching field 120 in performing of correct switching. This method can also be applied to speech transmission services.

FIG. 1B also illustrates how a circuit-switched data transmission service can be implemented between a computer 190 and a subscriber terminal 150. In principle, the switchings are roughly the same as in the case of a speech transmission service. In practice, however, differences exist in transcoding, for instance, and naturally in the actual transmission management. For example, the retransmission protocol of a non-transparent circuit-switched data transmission service is implemented by an IWF (Inter Working Function) located in the mobile services switching centre 132 and a TAF (Terminal Adaptation Function) located in the subscriber terminal 150.

Figure 2:
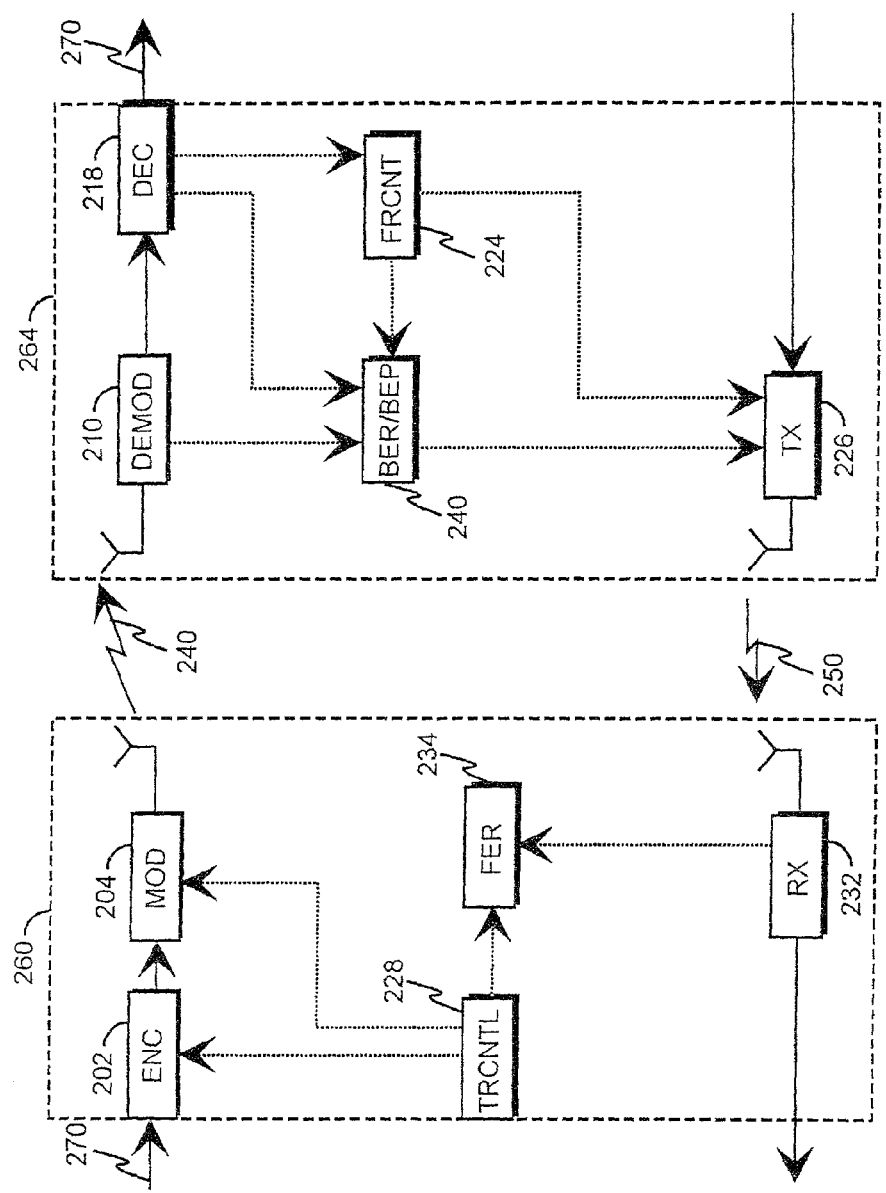
FIG. 2 is a simplified block diagram of a transmitter and a receiver.

FIG. 2 shows how the radio system of the invention can be implemented. The structure of a radio transmitter 260 is illustrated on the left-hand side of FIG. 2, and the structure of a radio receiver 264 is shown on the right-hand side.

The radio transmitter comprises means 202, 204, 228 for transmitting user data 270 to the receiver 264 using data frames of a traffic channel 240. A channel coder 202 is used for channel coding the user data 270 by means of selected channel coding. In addition, the data can be punctured and interleaved. Transmission means 204 send the encoded data to the receiver 264. The transmission means 204 comprise a modulator which modulates digital signals to a radio-frequency carrier wave. The transmission means may also comprise filters and power amplifiers.

The radio transmitter 260 further comprises means 228 for not transmitting all the data frames of the traffic channel 264 to the receiver 264 if the user data 270 are missing. In practice this means discontinuous data transmission, i.e. when there are breaks in speech or a break in data transmission, no data frame is transmitted. This method decreases the amount of radio traffic, and thus also interference between the cells. Furthermore, charge of the subscriber terminal's 150 battery lasts longer because the transmitter is not used needlessly.

The radio transmitter 260 also comprises means 202, 204, 228 for transmitting control data to the receiver 264 using associated control channel frames of the traffic channel 240. The control data are usually inserted into a SACCH (Slow Associated Control Channel), and their purpose is to maintain the traffic channel. Thus control and measuring parameters are transmitted over the SACCH to maintain the link between the base station 100 and the subscriber terminal 150. Since the SACCH is inserted into the traffic channel, a separate SACCH is available for each connection 170 between the subscriber terminal 150 and the base station 100.

The means 228 control establishment of traffic channels, insertion of associated control channel into a traffic channel, discontinuous transmission, and in the case of discontinuous transmission, the means 228 prevent transmission of data frames. When the user data are missing, the transmitter 260 may transmit silence descriptor frames in place of some data frames. If the service 270 is a speech transmission service, comfort noise is inserted into the silence descriptor frame. When the service 270 is a data transmission service, predetermined data are inserted into the silence descriptor frame, which are not the user's payload data but pseudo data which facilitate maintenance of the radio link. An example of pseudo data is an L2 fill frame which is transmitted as a FACCH (Fast Associate Control Channel) in place of the silence descriptor frame. L2 refers to layer two of the OSI model (Open Systems Interconnection).

In addition, the radio transmitter 260 comprises means 228 for calculating the number of all frames transmitted to the receiver 262 on the traffic channel 240 during a certain period. This information is supplied to means 234.

The radio receiver 264 comprises receiving means 210 for receiving data which have been channel coded with the selected channel coding. The receiving means 210 comprise a filter which prevents frequencies outside the desired frequency band. After this, the signal is converted into an intermediate frequency or directly into the baseband in which form a signal is sampled and quantized in an analogue/digital converter. A possible equalizer compensates for interference, e.g. interference caused by multi-path propagation.

A detected signal is supplied to a channel decoder 218 which decodes the received encoded data. When convolutional coding is used as the channel coding, a Viterbi decoder is an efficient decoder 218.

According to the prior art, the receiver 264 may comprise means 240 for calculating the bit error ratio estimates and/or bit error probabilities described above, which can then be signalled to the transmitter 260. Calculation may be part of a channel equalization process, decoding process or pseudo error calculation, for example.

According to the invention, the receiver 264 comprises means 224 for calculating the number of all frames received on the traffic channel 240 and decoded correctly during a certain period.

According to the invention, the cellular radio network comprises means 234 for calculating a quality value for a service 270 transmitted on the traffic channel 240 during a certain period by subtracting the number of frames transmitted during this period from the number of frames received during this period, and by dividing the difference obtained with the number of frames transmitted during this period. In the example of FIG. 2 this is implemented by providing the transmitter 260 in the network part of the cellular radio network and the receiver 262 in the subscriber terminal, in which case the receiver 264 comprises means 226 for signalling 250 the number of received frames to the transmitter 260, i.e. the number of all frames received on the traffic channel 240 and decoded correctly, and the means 234 for calculating the quality value are in the network part, or, more precisely, in the base station 100. In that case the means 226 are implemented with a normal radio transmitter, i.e. the radio receiver 264 is a transceiver; correspondingly, the transmitter 260 in the base station 100 comprises a receiver 232 which receives signalling related to the number of received frames, which is then supplied to the means 234.

The calculated quality value is used for controlling the power control of the traffic channel 240 and/or handover and/or link adaptation and/or optimization of the cellular radio network function.

Figure 3:
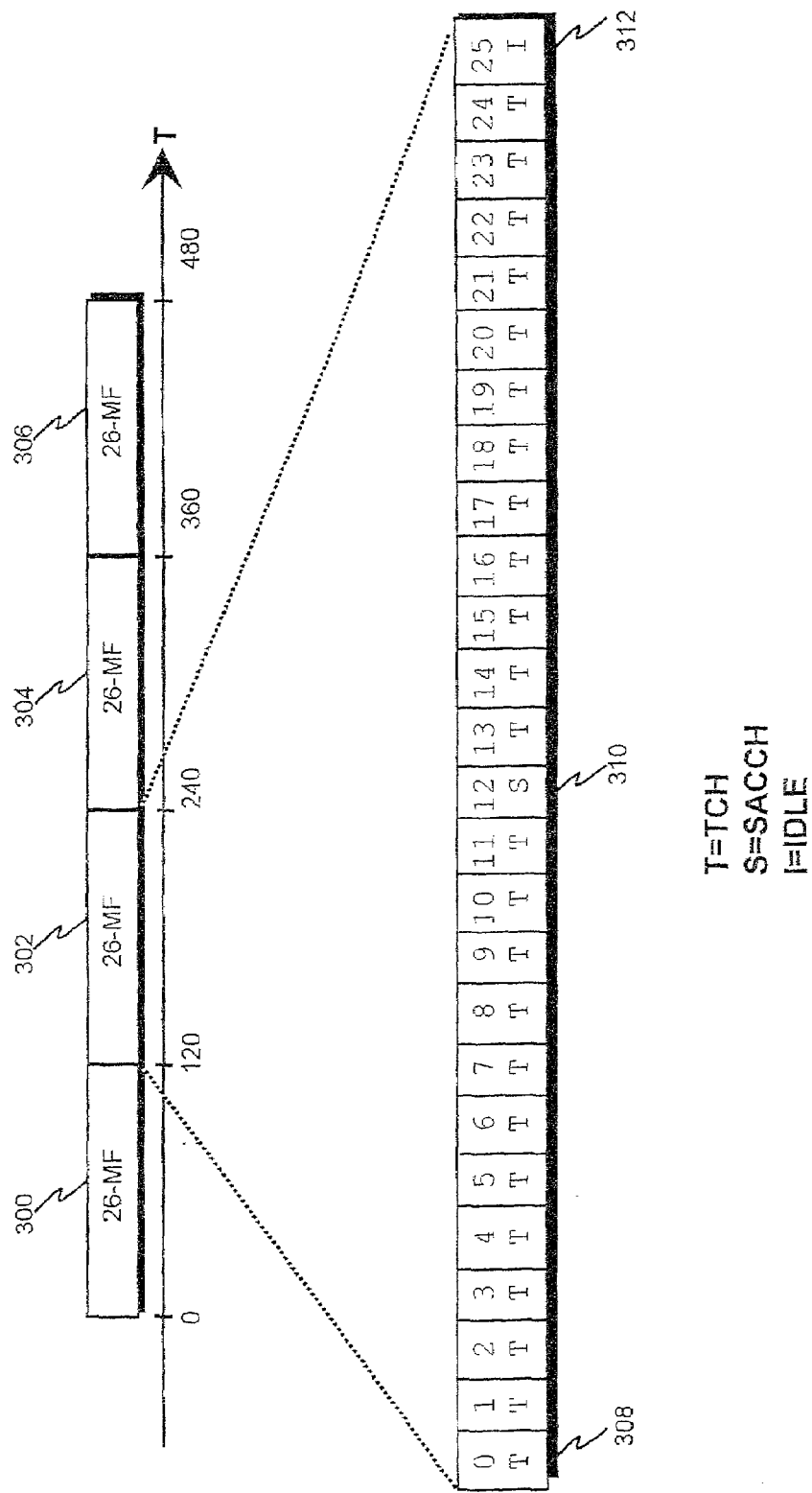
FIG. 3 is an example of a frame structure used in the cellular radio network.

FIG. 3 illustrates an example of the structure of a full rate traffic channel used in the cellular radio network. The traffic channels are inserted into a 26-multiframe 300, 302, 304, 306. The duration of each 26-multiframe is 120 milliseconds. Four 26-multiframes constitute one SACCH multiframe. One 26-multiframe consists of twenty-six frames 0, 1, . . . , 25. The first twenty-four frames 308 are called a data frame because user payload is inserted into it. These frames are marked with letter T in FIG. 3. Furthermore, a SACCH is inserted into one associated control channel frame 310, this frame being marked with letter S in FIG. 3. The last frame 312 is idle and marked with letter I in FIG. 3. At the idle frame the subscriber terminal 150 can measure a neighbouring cell or its own cell. When discontinuous transmission is used, only associated control channel frames 310 are transmitted. In addition to these, silence descriptor frames are transmitted in speech services, e.g. by transmitting half a frame of comfort noise once in each of eight successive frames during four 26-multiframes. In data transmission services it is possible to transmit eight L2 fill frames.

In one TDMA frame it is possible to transmit a time slot, i.e. a radio burst, of eight users, the duration of the time slot being 577 microseconds. Eight radio bursts constitute one frame of the 26-multi frame described above since 8×577 microseconds=4.615 milliseconds, and 26×4.615 milliseconds=120 milliseconds.

The above-mentioned RX_QUAL_FULL is calculated from each frame of the four 26-multiframes, except from idle frames 312, i.e. from hundred frames 308, 310 marked with letters T and S. Correspondingly, the RX_QUAL_SUB is calculated during discontinuous transmission from frames which are transmitted in principle in four 26-multiframes, i.e. from four associated control frames 310 marked with letter S and from eight silence descriptor frames or L2 fill frames, that is from twelve frames altogether. These parameters have eight values for the bit error ratio. Value zero is the best and means that the real bit error ratio is below 0.1 per cent. Value seven is the worst and means that the real bit error ratio is over 15 per cent.

The invention is preferably implemented by software, in which case the method of the invention requires only relatively simple changes to the software in a strictly defined area in the radio transmitter 260 and radio receiver 264. The means 224, 228, 234, 240 are preferably implemented as software, e.g. as software to be performed in a general-purpose processor. The invention can also be implemented by hardware, e.g. as an ASIC (Application Specific Integrated Circuit) or as control logic consisting of separate components.

If the signalling capacity of the cellular radio network is to be saved, the signalling of the number of received frames replaces the bit error ratio estimate, which the receiver 264 has calculated from some of received frames and which is to be signalled to the transmitter 260, such as parameter RX_QUAL_SUB or the bit error ratio calculated from all received frames and signalled to the transmitter 260, such as parameter RX_QUAL_FULL. If these prior art raw bit error ratios are to be used, their accuracy can be improved by calculating the bit error ratio estimate to be signalled to the transmitter 260 only from correctly decoded frames, i.e. from frames that contain no errors after channel decoding.

The following solution is also possible: at least one bit error ratio estimate to be signalled to the transmitter 260 is replaced with the bit error probability calculated by the receiver 264 from the received frames, such as parameter BEP_MEAN. The accuracy of this parameter can also be improved by calculating the bit error probability to be signalled to the transmitter 260 only from correctly decoded frames.

Even though the example of FIG. 2 illustrates only the quality measurement of a downlink, the invention is also applicable to an uplink. In that case the transmitter 260 is in the subscriber terminal 150 and the receiver 264 in the network part of the cellular radio network. The transmitter 260 comprises means for signalling the number of all frames transmitted to the receiver on the traffic channel, and the means 234 for calculating the quality value are in the network part, most probably in the base station 100.

Figure 4:
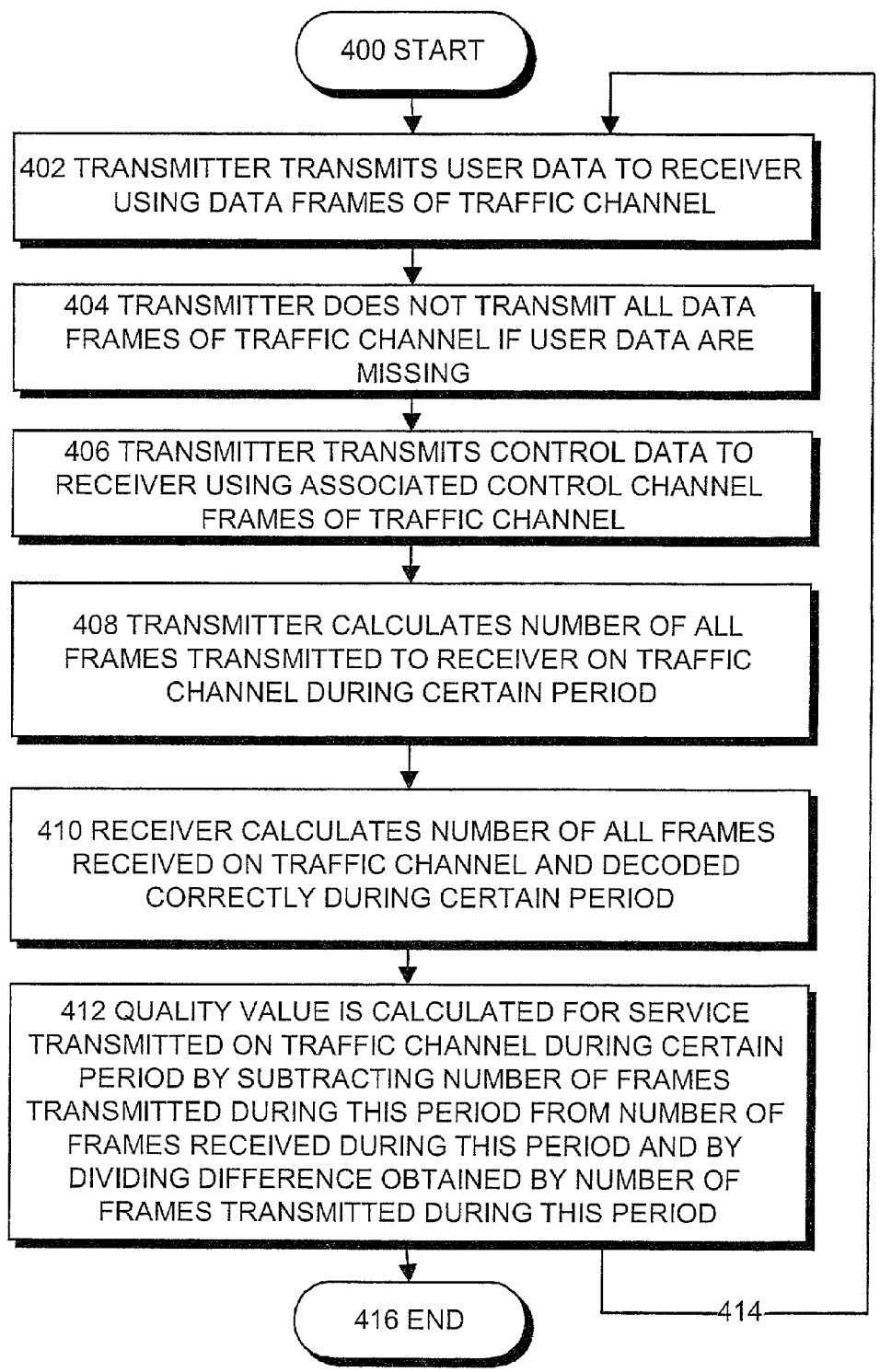
FIG. 4 is a flow chart illustrating a quality measurement method of a circuit-switched service.

Next, a method according to the invention of measuring the quality of a circuit-switched service transmitted on the traffic channel between the transmitter and the receiver will be described by means of a flow chart with reference to FIG. 4. The method starts in block 400.

In block 402 the transmitter transmits user data to the receiver using data frames of the traffic channel.

In block 404 the transmitter does not transmit all data frames of the traffic channel since the user data are missing.

In block 406 the transmitter transmits control data to the receiver using associated control channels of the traffic channel.

In block 408 the transmitter calculates the number of frames transmitted to the receiver during a certain period.

In block 410 the receiver calculates the number of frames received on the traffic channel and decoded correctly during a certain period.

Finally in block 412 the quality value of a service to be transmitted on the traffic channel during a certain period is calculated by subtracting the number of frames transmitted during this period from the number of frames received during this period and by dividing the difference obtained by the number of frames transmitted during this period.

In practice the method is carried out as a continuous process which lasts for the whole existence of the radio connection. This is illustrated with arrow 414, which shows transfer from block 412 to block 402, where calculation of the quality value of the next period starts. After the radio connection has been terminated, the process proceeds to block 416 where the method ends.

Even though the invention has been described with reference to the example according to the accompanying drawings, it is clear that the invention is not limited thereto but may be modified in various ways within the inventive concept disclosed in the appended claims.

What is claimed is:

1. A method of measuring the quality of a circuit-switched service transmitted on a traffic channel between a transmitter and a receiver in a cellular radio network, comprising:
   the transmitter transmitting user data to the receiver using data frames of the traffic channel;
   the transmitter omitting transmission of all data frames of the traffic channel to the receiver based on a determination that the user data are missing;
   the transmitter transmitting control data to the receiver using associated control channels of the traffic channel;
   the transmitter calculating a number of frames transmitted to the receiver on the traffic channel during a certain time period;
   the receiver calculating a number of all frames received and correctly decoded during that certain time period; and
   calculating a quality value for a service to be transmitted on the traffic channel during that certain time period by subtracting the number of frames transmitted during that certain time period from the number of frames received and correctly decoded during that certain time period divided by the number of frames transmitted during that certain time period.

2. The method of claim 1, wherein the transmitter transmits silence descriptor frames in place of data frames, if the user data are missing.

3. The method of claim 2, wherein comfort noise is inserted into the silence descriptor frame, if the service is a speech transmission service.

4. The method of claim 2, wherein predetermined data are inserted into the silence descriptor frame, if the service is a data transmission service.

5. The method of claim 1, wherein
   the transmitter is in a network part of the cellular radio network and the receiver is in a subscriber terminal;
   the receiver is configured to transmit an indication of a number of frames received on the traffic channel and correctly decoded to the transmitter; and
   the quality value is calculated for a downlink in the network part.

6. The method of claim 5, wherein the transmitted number of received frames replaces a bit error ratio estimate, which iscalculated by the receiver based on received frames and is subsequently transmitted to the transmitter.

7. The method of claim 5, wherein the transmitted number of received frames replaces a bit error ratio estimate, which is calculated by the receiver from all frames received on the traffic channel and is subsequently transmitted to the transmitter.

8. The method of claim 6, wherein the bit error ratio estimate transmitted to the transmitter is replaced with a bit error probability which is calculated based on frames received by the receiver.

9. The method of claim 6, wherein the bit error ratio estimate or bit error probability transmitted to the transmitter is calculated based only on correctly decoded frames.

10. The method of claim 1, wherein the transmitter is in a subscriber terminal and the receiver in a network part of the cellular radio network;
the transmitter transmits the number of all frames transmitted on the traffic channel to the receiver; and
the quality value for an uplink is calculated in the network part.

11. The method of claim 1, wherein the calculated quality value is used for controlling power control of the traffic channel and/or handover and/or link adaptation and/or optimization of a cellular radio network function.

12. A cellular radio network comprising a transmitter and a receiver, which communicates with the transmitter over a traffic channel on which a circuit-switched service is transmitted and which consists of data frames and associated control channel frames;
the transmitter comprising:
means for transmitting user data to the receiver using data frames of the traffic channel;
means for omitting transmission all data frames of the traffic channel to the receiver based on a determination that the user data are missing;
means for transmitting control data to the receiver using associated control channel frames of the traffic channel; and
means for calculating a number of all frames transmitted to the receiver on the traffic channel during a certain time period;
the receiver comprising:
means for calculating a number of all frames received on the traffic channel and correctly decoded during that certain time period; and
the cellular radio network comprising:
means for calculating a quality value for a service transmitted on the traffic channel during that certain time period by subtracting the number of frames transmitted during that certain time period from the number of frames received and correctly decoded during that certain time period, divided by the number of frames transmitted during that certain time period.

13. The cellular radio network of claim 12, wherein the transmitter transmits silence descriptor frames in place of data frames, if the user data are missing.

14. The cellular radio network of claim 13, wherein comfort noise is inserted into the silence descriptor frame, if the service is a speech transmission service.

15. The cellular radio network of claim 13, wherein predetermined data are inserted into the silence descriptor frame, if the service is a data transmission service.

16. The cellular radio network of claim 12, wherein
the transmitter is in a network part of the cellular radio network and the receiver in a subscriber terminal;
the receiver further comprises means for transmitting an indication of a number of frames received on the traffic channel and correctly decoded to the transmitter; and
the means for calculating the quality value are in the network part.

17. The cellular radio network of claim 16, wherein the transmitted number of received frames replaces a bit error ratio estimate, which is calculated by the receiver from received frames and is subsequently transmitted to the transmitter.

18. The cellular radio network of claim 16, wherein the transmitted number of received frames replaces a bit error ratio estimate, which is calculated by the receiver from all frames received on the traffic channel and is subsequently transmitted to the transmitter.

19. The cellular radio network of claim 17, wherein the bit error ratio estimate signalled to the transmitter is replaced with a bit error probability which is calculated from-frames received on the traffic channel by the receiver.

20. The cellular radio network of claim 17, wherein the bit error ratio estimate or bit error probability transmitted to the transmitter is calculated based only on correctly decoded frames.

21. The cellular radio network of claim 12, wherein
the transmitter is in a subscriber terminal and the receiver in a network part of the cellular radio network; and
the transmitter further comprises means for transmitting an indication of a number of frames transmitted to the receiver on the traffic channel; and
wherein the means for calculating the quality value are in the network part.

22. The cellular network of claim 12, wherein the calculated quality value is used for controlling power control of the traffic channel and/or handover and/or link adaptation and/or optimization of a cellular radio network function.

23. A cellular radio network element, comprising
means for transmitting user data to a subscriber terminal using data frames of a traffic channel of a circuit-switched service;
means for omitting transmission of all data frames of the traffic channel to the subscriber terminal based on a determination that the user data are missing;
means for transmitting control data to the subscriber terminal using associated control channel frames of the traffic channel;
means for calculating a number of frames transmitted to the subscriber terminal on the traffic channel during a certain time period;
means for receiving, from the subscriber terminal, an indication of a number of frames received on the traffic channel and correctly decoded in the subscriber terminal; and
means for calculating a quality value for a service transmitted on the traffic channel during the certain time period by subtracting the number of frames transmitted during the certain time period from the number of frames received and correctly decoded during that certain time period, divided by the number of frames transmitted during that certain time period.

24. The cellular radio network element of claim 23, wherein the means for transmitting user data transmits silence descriptor frames in place of data frames, if the user data are missing.

25. A cellular radio network element comprising:
  means for receiving user data from a transmitter using data frames of a traffic channel;
  means for receiving control data from the transmitter using associated control channel frames of the traffic channel;
  means for receiving, from the transmitter, an indication of the number of frames transmitted to the receiver on the traffic channel;
  means for calculating a number of all frames received on the traffic channel and correctly decoded during a certain time period; and
  means for calculating a quality value for a service transmitted on the traffic channel during that certain time period by subtracting a number of frames transmitted during that certain time period from the number of frames received and correctly decoded during that certain time period, divided by the number of frames transmitted during that certain time period.

26. The cellular radio network element of claim 25, wherein the means for receiving user data receives silence descriptor frames in place of data frames, if the user data are missing.

27. A cellular radio network element, comprising:
  a transceiver configured to transmit user data to a subscriber terminal using data frames of a traffic channel of a circuit-switched service and to omit transmission of all data frames of the traffic channel to the subscriber terminal based on a determination that the user data are missing, wherein the transceiver is further configured to transmit control data to the subscriber terminal using associated control channel frames of the traffic channel and to calculate a number of frames transmitted to the subscriber terminal on the traffic channel during a certain time period, wherein the transceiver is further configured to receive, from the subscriber terminal, an indication of a number of frames received on the traffic channel and correctly decoded in the subscriber terminal during that certain time period;
  wherein the transceiver is further configured to calculate a quality value for a service transmitted on the traffic channel during the certain time period by subtracting the number of frames transmitted during the certain time period from the number of frames received and correctly decoded during that certain time period, and by dividing a difference divided by the number of frames transmitted during that certain time period.

28. The cellular radio network element of claim 27, wherein the transceiver transmits silence descriptor frames in place of data frames, if the user data are missing.

29. A cellular radio network element comprising:
  a receiver configured to receive user data from a transmitter using data frames of a traffic channel and to receive control data from the transmitter using associated control channel frames of the traffic channel; the receiver being further configured to receive, from the transmitter, an indication of the number of frames transmitted to the receiver on the traffic channel and configured to calculate a number of all frames received on the traffic channel and correctly decoded during a certain time period;
  wherein the receiver is further configured to calculate a quality value for a service transmitted on the traffic channel during that certain time period by subtracting a number of frames transmitted during that certain time period from the number of frames received and correctly decoded during that certain time period, divided by the number of frames transmitted during that certain time period.

30. The cellular radio network element of claim 29, wherein the receiver is further configured to receive silence descriptor frames from the transmitter in place of data frames, if user data are missing.

31. An article of manufacture for measuring the quality of a circuit-switched service transmitted on a traffic channel between a transmitter and a receiver in a cellular radio network, the article of manufacture comprising a machine readable medium containing one or more programs which when executed implement the steps of:
  transmitting user data to a subscriber terminal using data frames of a traffic channel of a circuit-switched service;
  omitting transmission of all data frames of the traffic channel to the subscriber terminal based on a determination that the user data are missing;
  transmitting control data to the subscriber terminal using associated control channel frames of the traffic channel;
  calculating a number of frames transmitted to the subscriber terminal on the traffic channel during a certain time period;
  receiving, from the subscriber terminal, an indication of a number of frames received on the traffic channel and correctly decoded in the subscriber terminal; and
  calculating a quality value for a service transmitted on the traffic channel during the certain time period by subtracting the number of frames transmitted during the certain time period from the number of frames received and correctly decoded during that certain time period, divided by the number of frames transmitted during that certain time period.

32. The article of manufacture of claim 31, wherein the one or more programs further implement receiving of silence descriptor frames in place of data frames, if user data are missing.

* * * * *